April 17, 1956 — R. S. ZEBARTH — 2,741,795
POULTRY SCALDING MACHINE HAVING A ROTATABLE BASKET
Filed Dec. 12, 1951 — 3 Sheets-Sheet 1

INVENTOR.
Ralph S. Zebarth
BY
ATTORNEY.

INVENTOR.
Ralph S. Zebarth
BY
ATTORNEY.

April 17, 1956

R. S. ZEBARTH 2,741,795

POULTRY SCALDING MACHINE HAVING A ROTATABLE BASKET

Filed Dec. 12, 1951

INVENTOR.
Ralph S. Zebarth
BY
ATTORNEY.

2,741,795

POULTRY SCALDING MACHINE HAVING A ROTATABLE BASKET

Ralph S. Zebarth, Hickman Mills, Mo., assignor to Gordon Johnson Equipment Company, Kansas City, Mo., a corporation of Missouri Application December 12, 1951, Serial No. 261,329

2 Claims. (Cl. 17—11.2)

This invention relates to equipment for dressing poultry and has for its primary object the provision of a machine in the nature of a scalder wherein is provided a rotatable receiver for the poultry to be scalded, to continuously dip or force the poultry through a body of hot water, thereby completely and effectively softening and loosening the feathers preparatory to plucking operations.

It is the most important object of the present invention to provide a poultry scalder of the above mentioned type including a rotatable, foraminous poultry receiving basket mounted for rotation within a cylinder and having an open side that is closed when the machine is in operation solely by the circular side walls of the cylinder, to the end that the birds will be continuously rolled and rumbled as the same are forced through the hot water as a function of the rotating basket.

Another important object of the present invention is to provide a scalder having a rotatable basket as above indicated, together with control means interconnecting the basket and a prime mover therefor automatically predetermining the number of cycles of revolution of the basket.

Another object hereof is the provision of control means for scalders that includes manually operable parts for permitting pre-selection of the number of cycles of revolution of the magazine.

Other objects include the way in which the foraminous basket is counterweighted, to the end that the same will always come to rest in an upright condition for draining purposes; the way in which clutch means is provided as a part of the mechanism interconnecting the prime mover and the basket and disengageable automatically after a predetermined number of revolutions of the basket; the way in which the control means is pre-set by the operator and the clutch means re-engaged during the setting step; and many other more minor objects, all of which will be made clear as the following specification progresses.

Figure 1:
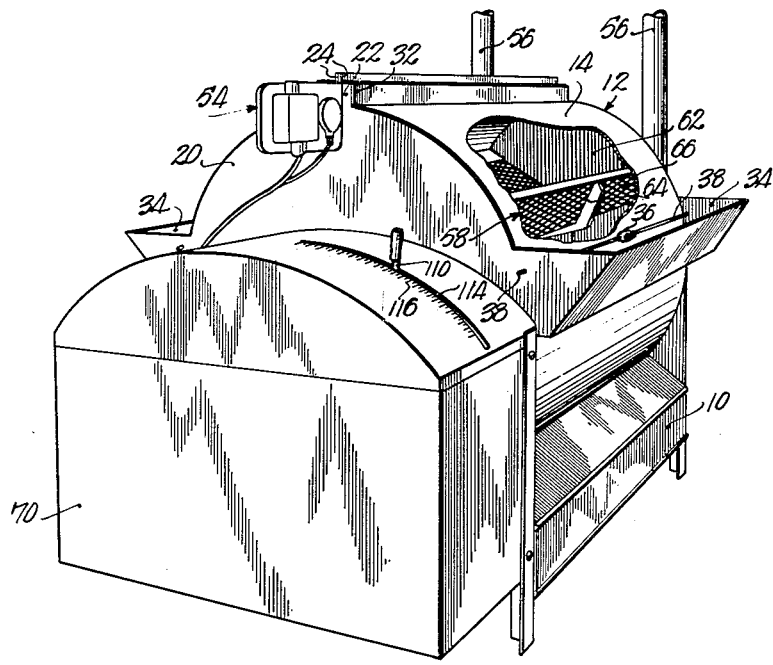
Figure 1 is a perspective view showing one end and one side of a poultry scalding machine having a rotatable basket made pursuant to the present invention.

A hollow case broadly designated by the numeral 10, carries an elongated, hollow, cylindrical body 12 having its longitudinal axis disposed horizontally and provided with a pair of identical, arcuate lids 14 and 16 which combine to form the upper half of the cylinder 12.

The end walls 18 and 20 of cylinder 12 are each provided with an upstanding ear 22 joined by a pair of back-to-back, L-shaped connectors 24 that in turn receive hinges 26 and 28 to swingably mount the lids 14 and 16 respectively. Lids 14 and 16 are in turn provided with L-shaped portions 30 and 32 respectively that bear against the upstanding portions of connectors 24 as illustrated by dotted lines in Fig. 7 of the drawings when the lids 14–16 are swung to the open position.

A pair of opposed, open top hoppers 34, forming a part of the body 12 and coextensive in length therewith, communicate with the interior of body 12 when the lids 14 and 16 are open. Lids 14 and 16 are releasably held in the closed position shown in Figs. 1, 2 and 7 of the drawings by a rotatable latch 36 having opposed, retractable rods 38 that extend through the end walls 18 and 20, as illustrated in Figs. 1 and 2 of the drawings when in a locked position.

End wall 18 of the body 12, carries a tank 40 connected with a suitable source of water (not shown) by means of a supply pipe 42 that is in turn provided with a valve 44 controlled by a float 46 within tank 40. Tank 40 is placed into communication with the cylinder 12 by means of an opening 48 and it is seen therefore, that the level of water within the cylinder 12 is controlled by the level of water in tank 40 as determined by float 46. A drain pipe 50 below the tank 40 extends through the wall 18 of cylinder 12.

Figure 2:
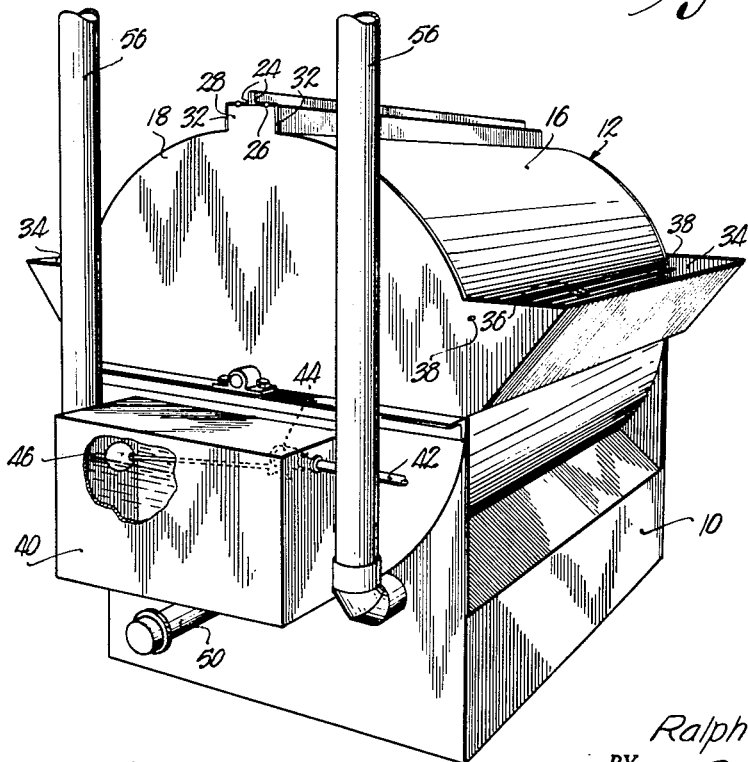
Fig. 2 is a perspective view illustrating the opposite side and opposite end of the scalder.
Figure 3:
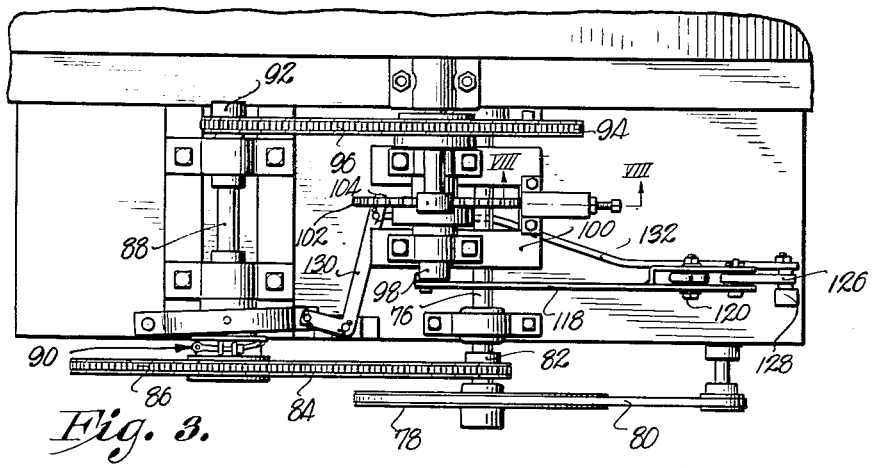
Fig. 3 is a fragmentary, top plan view of the control mechanism with the housing therefor entirely removed.
Figure 7:
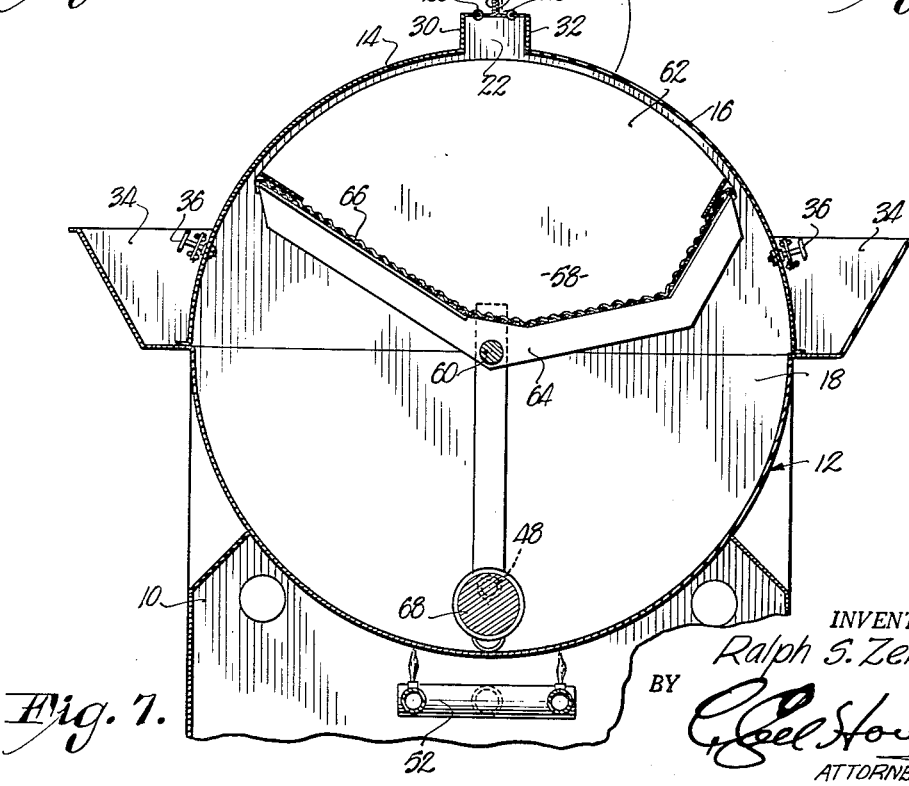
Fig. 7 is a fragmentary, vertical, cross-sectional view taken through the cylindrical body or drum and the basket therein.

Water in the cylinder 12 is heated by a burner 52 within the case 10, below the cylinder 12 as shown in Fig. 7 of the drawings, and the temperature of the water may be thermostatically controlled through the medium of a control unit broadly designated by the numeral 54, and carried by the end wall 20 as shown in Fig. 1 of the drawings. Flue means 56 communicating with the case 10 carry away the burnt products of combustion.

A rotatable element or receiver for the poultry to be scalded in the nature of a basket broadly designated by the numeral 58, is mounted on a horizontal, rotatable shaft 60 within the cylinder 12. Shaft 60 extends through the end walls 18 and 20 of cylinder 12, and as shown in Fig. 7 of the drawings, the basket 58 is disposed entirely on one side of the axis of rotation of shaft 60. Basket 58 is substantially arcuate and includes a pair of spaced, preferably imperforate end plates, one only of which is shown in Figs. 1 and 7 of the drawings and designated by the numeral 62. End plates 62 are joined by suitable framework as shown in Figs. 1 and 7 including a transverse member 64 which, like end plates 62, is joined to the rotatable shaft 60. Basket 58 has a foraminous wall 66 spanning the distance between the end plates 62 and made from any suitable material such as expanded metal lath. It is thus seen particularly in Fig. 7 of the drawings, that basket 58 is entirely open at that side thereof opposite to the foraminous wall 66, which open side is closed by the circular side wall of the cylinder 12.

Basket 58 is held biased in the upright position shown in Fig. 7 of the drawings by counterweight 68 depending from the shaft 60.

A hollow housing 70 on that end of the case 10 adjacent end wall 20 of cylinder 12 contains control mechanism of the kind shown in Figs. 3 to 6 inclusive, and 8 of the drawings. This control means includes a suitable prime mover 72 that may well constitute an electric motor as shown suspended from a suitable platform 74. An idler shaft 76 on the platform 74 has a pulley 78 connected with the prime mover 72 by an endless belt 80. Idler shaft 76 is also provided with a small sprocket wheel 82 having an endless chain 84 trained thereabout, chain 84 also passing over a larger sprocket wheel 86.

A second idler shaft 88 carried by the platform 74 in parallelism with idler shaft 76, is provided with disengageable structure in the nature of a clutch broadly designated by the numeral 90, clutch 90 interconnecting the sprocket wheel 86 and the shaft 88 when engaged. Idler shaft 88 has a small sprocket wheel 92 that is connected with a larger sprocket wheel 94 on the shaft 60 by means of an endless chain 96.

Figure 8:
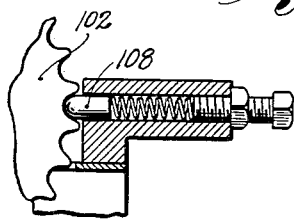
Fig. 8 is a fragmentary, enlarged, detailed, cross-sectional view taken on line VIII—VIII of Fig. 3 looking in the direction of the arrows.
Figures 5, 6:
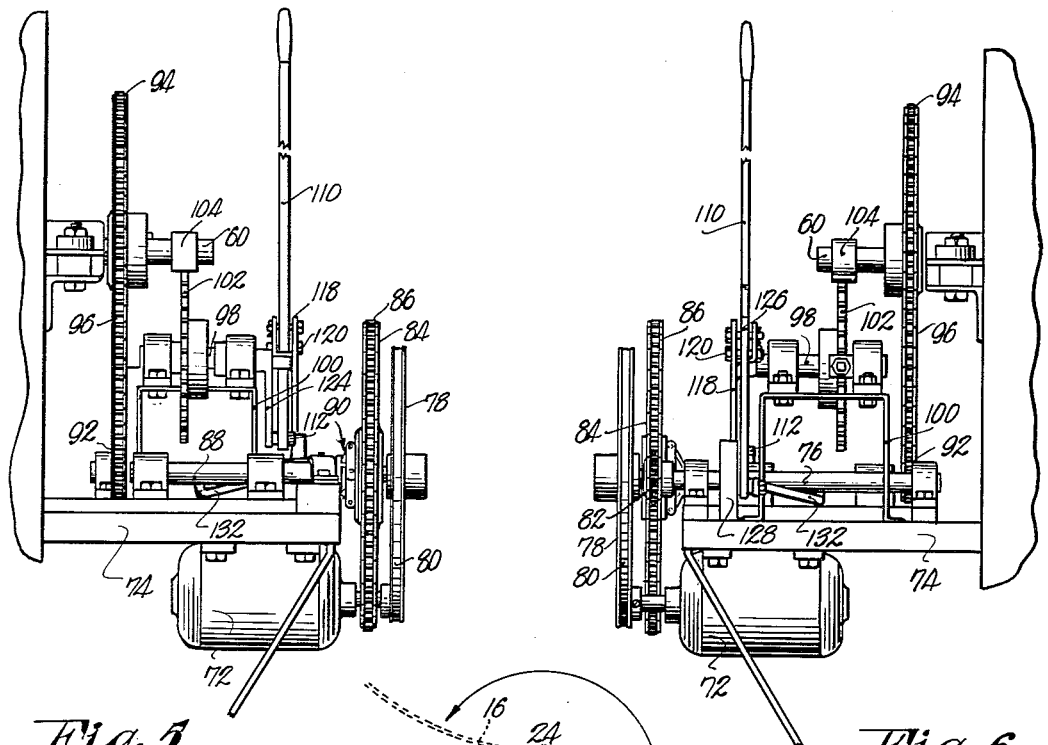
Fig. 5 is an end elevational view of the control mechanism per se.
Fig. 6 is an elevational view showing the opposite end of the control mechanism.

There is provided apparatus responsive to the rotation of the basket 58 for determining the number of cycles of rotation thereof. Such apparatus includes a stub shaft 98 carried by bracket 100 on the platform 74 and having a rotatable device in the nature of a control gear 102 connected thereto. An intermittent gear 104 on the shaft 60, has a single tooth 106 adapted to mesh with the peripheral teeth of the control gear 102. Locating means for yieldably holding gear 102 against rotation is illustrated in Fig. 8 of the drawings and includes a spring-loaded pin or ball 108 disposed to be received by the teeth of gear 102.

A manually operable member in the nature of an elongated lever 110 is pivotally mounted as at 112 and extends upwardly through a slot 114 in the housing 70, the latter being provided with a graduated scale 116 adjacent the slot 114. Lever 116 is connected with an arm 118 intermediate the ends of the latter by a pin 120 that is freely slidable within a slot 122 in the lever 110. One end of the arm 118 is pivotally connected to a laterally extending crank 124 on the stub shaft 98. The opposite end of the lever or arm 118 is pivotally connected to a link 126 that is in turn pivotally mounted on a bracket 128 carried by the platform 74.

An L-shaped crank 130 swingably carried by the platform 74 is pivotally connected to the clutch 90 and to one end of a rod 132 that is in turn pivotally connected to the link 126.

In operation, the cylinder 12 is charged with water to be heated by burner 52 by means of pipe 42 and opening 48, the level of water in the cylinder 12 being as above stated, determined by the float 46 in tank 40. After the water in cylinder 12 has been heated to the proper temperature, an operator standing on either side of the unit may open the corresponding lid 14 or 16 as the case may be, by turning the proximal latch 36. Upon opening of such lid, a large access opening to the cylinder 12 is presented by virtue of the movement of the lid to the position shown by dotted lines in Fig. 7 of the drawings, resting upon one of the connecting elements 24.

A relatively large number of birds may be placed in the basket 58 quickly and easily, whereupon both lids 14 and 16 are locked in the closed position by means of latches 36. Prime mover 72 is thereupon energized to impart rotative movement to the basket 58. The motor 72 rotates pulley 78 by means of belt 80 and accordingly, the idler shaft 76. Rotation of the small sprocket wheel 82 drives chain 84 and accordingly sprocket wheel 86 and idler shaft 88 through the clutch 90. Rotation of sprocket wheel 92 rotates the sprocket wheel 94 through chain 96, which in turn causes rotation of shaft 60 and accordingly, basket 58, as well as its counterweight 68.

The birds within the basket 58 are forced through the hot water in the cylinder 12 and during each cycle of rotation, such poultry is moved to a position above the level of the water in the cylinder 12 to the end that the birds will not become unduly burned by the scalding operation.

It is obvious that the large number of fowl within the basket 58 cannot move therefrom during the rotative operation because basket 58 is closed by the inner face of the cylindrical side wall of body 12.

Figure 4:
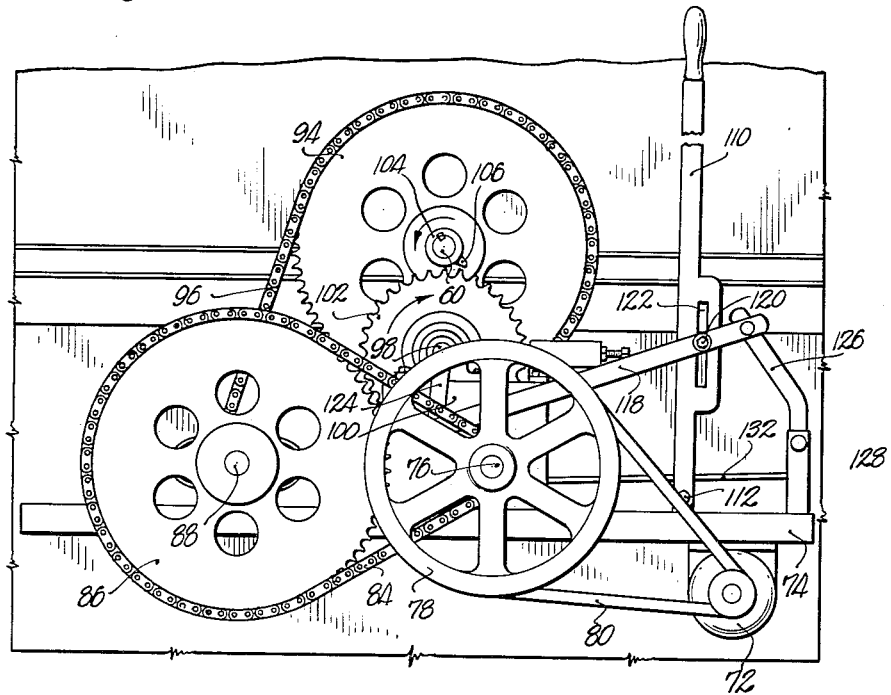
Fig. 4 is a fragmentary, elevational view showing that end of the machine illustrated in Fig. 1 with the housing of the control mechanism removed.

During the rotation of shaft 60, the intermittent gear 104 is rotated therewith and, during each cycle of rotation of gear 104, the tooth 106 thereof meshes with the control gear 102, stepping the same in the direction of the arrow shown in Fig. 4 of the drawings. The spring-loaded pin 108 yieldably holds the control gear 102 during the stepping operation.

Rotation of the control gear 102 swings the crank 124 to impart a pulling action on arm 118 and to thereby swing the lever 110 toward the shaft 60 and to swing the link 126 on its pivotal mounting with bracket 128. Such action shifts the rod 132 to swing the crank 130 and thereby actuate the clutch 90; after a perdetermined number of revolutions of the basket 58 to in turn step the control gear 102, the clutch 90 will become completely disengaged, thereby releasing the connection afforded by clutch 90 between sprocket wheel 86 and the idler shaft 88. The basket 58 will come to rest in the position shown in Fig. 7 of the drawings and excess water will immediately drain from the birds through the foraminous wall 66 of basket 58. The operator then may easily and quickly open one of the lids 14 or 16, remove the scalded birds and refill the basket 58 with an additional number of birds to be scalded.

Preparatory to the next operation, the lever 110 is shifted away from the shaft 60 on its pivotal connection 112 to re-engage the clutch 90 and to set the control gear 102 and thereby determine the number of cycles of revolution of the basket 58. The scale 118 along side the slot 114 in housing 70, aids the operator in determining the number of cycles that basket 58 will rotate before clutch 90 becomes automatically disengaged, rendering prime mover 72 inoperable so far as rotating basket 58 is concerned. In other words, when the lever 110 is pulled downwardly to the lowermost end of the slot 114, the maximum number of revolutions of the basket 58 will take place before the clutch 90 becomes disengaged. Conversely, when the lever 110 is pulled downwardly along the slot 14, but a short distance to re-engage the clutch 90, the basket 58 will rotate only a few cycles before the prime mover is automatically disengaged from the shaft 60.

As the birds are removed, the float 46 operates to maintain a predetermined level of water in the cylinder 12 and the control means 54 cooperates to maintain the water at a predetermined temperature. Periodically the cylinder 12 may be drained by means of pipe 50 and a fresh supply of water furnished to the cylinder 12 for heating by burner 52.

Having thus described the invention, what is claimed as new and desired to be secured by Letters Patent is:

1. In a poultry scalding machine, an elongated cylinder adapted to receive a scalding liquid, said cylinder having a horizontal, longitudinal axis, a pair of opposed ends and a swingable lid between said end walls, forming a part of the upper half of the cylinder and terminating on a horizontal plane through said axis; a rotatable shaft spanning the distance between said ends and disposed on said axis; a basket secured rigidly to said shaft for receiving poultry to be scalded in said liquid upon rotation of the shaft and basket when the lid is closed, said basket spanning the distance between said ends and including a foraminous wall extending from adjacent the shaft outwardly in opposite directions; and an open top hopper mounted on the lower half of the cylinder above said plane and communicating with the cylinder when the lid is open.

2. In a poultry scalding machine, an elongated cylinder adapted to receive a scalding liquid, said cylinder having a horizontal, longitudinal axis, a pair of opposed ends and a swingable lid between said end walls, forming a part of the upper half of the cylinder and terminating on a horizontal plane through said axis; a rotatable shaft spanning the distance between said ends and disposed on said axis; a basket secured rigidly to said shaft for receiving poultry to be scalded in said liquid upon rotation of the shaft and basket when the lid is closed, said basket spanning the distance between said ends and including a foraminous wall extending from adjacent the shaft outwardly in opposite directions; and a counterweight secured to the shaft therebelow when the basket is at rest for holding the latter balanced above said plane.

References Cited in the file of this patent

UNITED STATES PATENTS

| | | |
|---|---|---|
| 482,283 | Thomas | Sept. 6, 1892 |
| 550,251 | Carter | Nov. 26, 1895 |
| 1,130,127 | Yandle | Mar. 2, 1915 |
| 1,660,583 | Shrauger | Feb. 28, 1928 |
| 2,479,395 | Mumper | Aug. 16, 1949 |
| 2,571,032 | Hanson | Oct. 9, 1951 |
| 2,572,272 | McLagan | Oct. 23, 1951 |
| 2,594,909 | Georgeff | Apr. 29, 1952 |